US011332645B2

United States Patent
Matsuo et al.

(10) Patent No.: US 11,332,645 B2
(45) Date of Patent: May 17, 2022

(54) CONDUCTIVE ADHESIVE AND CURED PRODUCT THEREOF

(71) Applicant: THREEBOND CO., LTD., Tokyo (JP)

(72) Inventors: Kanako Matsuo, Tokyo (JP); Hitoshi Mafune, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 27 days.

(21) Appl. No.: 16/964,304

(22) PCT Filed: Jan. 8, 2019

(86) PCT No.: PCT/JP2019/000220
§ 371 (c)(1),
(2) Date: Jul. 23, 2020

(87) PCT Pub. No.: WO2019/159566
PCT Pub. Date: Aug. 22, 2019

(65) Prior Publication Data
US 2021/0040358 A1  Feb. 11, 2021

(30) Foreign Application Priority Data
Feb. 14, 2018 (JP) .............................. JP2018-023713

(51) Int. Cl.
*C09J 9/02* (2006.01)
*C08K 3/08* (2006.01)
*C08K 5/55* (2006.01)
*C08K 9/04* (2006.01)
*C09J 11/06* (2006.01)
*C09J 163/00* (2006.01)

(52) U.S. Cl.
CPC ........ *C09J 9/02* (2013.01); *C08K 3/08* (2013.01); *C08K 5/55* (2013.01); *C08K 9/04* (2013.01); *C09J 11/06* (2013.01); *C09J 163/00* (2013.01); *C08K 2003/0806* (2013.01); *C08K 2201/001* (2013.01); *C08K 2201/003* (2013.01); *C09J 2203/326* (2013.01); *C09J 2203/35* (2020.08); *C09J 2203/354* (2020.08); *C09J 2463/00* (2013.01); *C09J 2469/006* (2013.01)

(58) Field of Classification Search
CPC .............. C08K 3/08; C08K 2003/0806; C08K 2201/001; C08K 2201/003; C08K 2201/014; C08K 5/55; C08K 9/04; C09J 163/00; C09J 11/06; C09J 2203/326; C09J 2203/35; C09J 2203/354; C09J 2463/00; C09J 2469/006; C09J 9/02; C08G 59/24; C08G 59/4064; C08G 59/4078; C08G 59/50; H01B 1/22
See application file for complete search history.

(56) References Cited

U.S. PATENT DOCUMENTS

| 10,964,440 | B2 * | 3/2021 | Hayashi | ............ C08G 59/4064 |
| 2007/0213429 | A1 * | 9/2007 | Cheng | ...................... H01R 4/04 |
| | | | | 523/458 |
| 2018/0079935 | A1 * | 3/2018 | Ota | ......................... C09J 11/06 |
| 2018/0148587 | A1 | 5/2018 | Watanabe et al. | |

FOREIGN PATENT DOCUMENTS

| JP | 2000-281759 | A | | 10/2000 |
| JP | 2017-162604 | A | | 9/2017 |
| JP | 2017-214472 | A | | 12/2017 |
| JP | 2017214472 | A | * | 12/2017 |
| WO | 2016/140204 | A1 | | 9/2016 |
| WO | 2016/189866 | A1 | | 12/2016 |
| WO | 2017/145801 | A1 | | 8/2017 |
| WO | 2018/003704 | A1 | | 1/2018 |

OTHER PUBLICATIONS

PCT, International Search Report for the corresponding patent application No. PCT/JP2019/000220, dated Mar. 12, 2019, with English translation.
PCT, Written Opinion of the International Searching Authority for the corresponding patent application No. PCT/JP2019/000220, dated Mar. 12, 2019.
CNIPA, Office Action for the corresponding Chinese patent application No. 201980009622.1, dated Oct. 8, 2021, with English translation.
CNIPA, Office Action for the corresponding Chinese patent application No. 201980009622.1, dated Mar. 4, 2022, with English translation.

\* cited by examiner

*Primary Examiner* — Mark Kopec
*Assistant Examiner* — Jaison P Thomas
(74) *Attorney, Agent, or Firm* — Lucas & Mercanti, LLP

(57) ABSTRACT

There is provided a conductive adhesive which can suppress erosion of polycarbonate and form a cured product exhibiting excellent conductivity at a low temperature. There is also provided a conductive adhesive which can form a cured product exhibiting excellent adhesive property to plastics (particularly carbonate) at a low temperature.
The conductive adhesive according to the present invention is a conductive adhesive which contains the following components (A) to (C) and is liquid at 25° C.:
component (A): an alicyclic epoxy resin;
component (B): a boron-based thermal cationic initiator; and
component (C): a conductive filler.

11 Claims, No Drawings

CONDUCTIVE ADHESIVE AND CURED PRODUCT THEREOF

CROSS REFERENCE TO RELATED APPLICATION

This Application is a 371 of PCT/JP2019/000220 filed on Jan. 8, 2019 which, in turn, claimed the priority of Japanese Patent Application No. 2018-023713 filed on Feb. 14, 2018, both applications are incorporated herein by reference.

TECHNICAL FIELD

The present invention relates to a conductive adhesive and a cured product thereof.

BACKGROUND ART

Conductive adhesives are adhesives containing a binder and a conductive filler. The binder exhibits properties as an adhesive, and the conductive filler exhibits electrical properties. Among these, conductive adhesives containing epoxy resins as a binder exhibit excellent adhesive force to various members and excellent durability and thus are widely used in electric and electronic device parts, automobile parts, aircraft parts and the like. However, due to the recent development and spread of smartphones, electronic mobile terminals, and the like, there is a demand for miniaturization, thinning, and densification of the parts constituting these, and there is a concern about thermal damage when the adhesive is cured. For this reason, epoxy resins curable at low temperatures are widely used, and similar demands are increasing for conductive adhesives as well (JP 2000-281759 A). Furthermore, in recent years, there has been a case in which polycarbonate is used in members in various fields because of its properties such as high transparency, impact resistance, heat resistance, flame retardancy and lightweight property.

SUMMARY OF INVENTION

In general, aromatic epoxy resins such as bisphenol A-type epoxy resin are often used in epoxy adhesives curable at low temperatures. However, there has been a problem that the members erode and a decrease in adhesive force and deterioration of members are caused in a case in which adhesives having such a composition are used in members made of polycarbonate.

The present invention has been made in view of the above circumstances, and an object thereof is to provide a conductive adhesive which can suppress erosion of polycarbonate and form a cured product exhibiting excellent conductivity at a low temperature. Another object of the present invention is to provide a conductive adhesive which can form a cured product exhibiting excellent adhesive property at a low temperature.

The present inventors have diligently carried out investigations to achieve the objects, as a result, discovered a technique relating to a conductive adhesive which can solve the above problems, and completed the present invention.

The gist of the present invention will be described below.
[1] A conductive adhesive containing the following components (A) to (C), the conductive adhesive being liquid at 25° C.:
component (A): an alicyclic epoxy resin;
component (B): a boron-based thermal cationic initiator; and
component (C): a conductive filler.
[2] The conductive adhesive according to [1], wherein the component (B) contains a salt of a quaternary ammonium cation and a borate anion.
[3] The conductive adhesive according to [1] or [2], wherein the component (B) contains at least either of a salt of a quaternary ammonium cation and a tetrafluoroborate anion or a salt of a quaternary ammonium cation and a tetrakis (pentafluorophenyl)borate anion.
[4] The conductive adhesive according to any one of [1] to [3], wherein the component (C) is a conductive filler having a surface treated with a lubricant.
[5] The conductive adhesive according to any one of [1] to [4], wherein the component (A) is an alicyclic epoxy resin having two or more epoxy groups in one molecule.
[6] The conductive adhesive according to any one of [1] to [5], wherein a tap density of each conductive filler as the component (C) is 0.1 to 100 g/cm$^3$.
[7] The conductive adhesive according to any one of [1] to [6], wherein the component (C) has a plurality of shapes.
[8] The conductive adhesive according to any one of [1] to [7], wherein the component (C) contains a conductive filler (C-1) having a 50% average particle diameter of 3 μm or more and a conductive filler (C-2) having a 50% average particle diameter of less than 3 μm and a ratio of a mass of the component (C-1) to a mass of the component (C-2) is 0.01 to 30.
[9] The conductive adhesive according to any one of [1] to [8], wherein the component (B) is contained at 0.1 to 30 parts by mass with respect to 100 parts by mass of the component (A).
[10] The conductive adhesive according to any one of [1] to [9], wherein the component (B) is contained at 1 to 20 parts by mass with respect to 100 parts by mass of the component (A).
[11] The conductive adhesive according to any one of [1] to [10], which is used for an adherend containing polycarbonate.
[12] A cured product of the conductive adhesive set forth in any one of [1] to [11].

DESCRIPTION OF EMBODIMENTS

Hereinafter, embodiments of the present invention will be described. Incidentally, the present invention is not limited only to the following embodiments. In addition, the operations and the measurement of physical properties and the like are performed under conditions of room temperature (range of 20° C. to 25° C.)/relative humidity of 40% to 50% RH unless otherwise stated. Moreover, in the present specification, "X to Y" indicating a range means "X or more and Y or less".

An embodiment of the present invention is a conductive adhesive which contains the following components (A) to (C) and is liquid at 25° C.:
component (A): an alicyclic epoxy resin;
component (B): a boron-based thermal cationic initiator; and
component (C): a conductive filler.

The conductive adhesive can suppress erosion of polycarbonate and form a cured product exhibiting excellent conductivity at a low temperature. Moreover, the conductive adhesive according to the present invention can form a cured product exhibiting excellent adhesive property to plastics (particularly polycarbonate) at a low temperature. In the present specification, a "low temperature" refers to, for example, 150° C. or lower, preferably 120° C. or lower, more preferably 100° C. or lower, and still more preferably 80° C. or lower.

The details of the conductive adhesive (hereinafter, also simply referred to as an adhesive) according to the present invention will be described below.

The conductive adhesive in the present invention is liquid at 25° C. As the conductive adhesive is liquid, the coating method, coating pattern and the like thereof are not limited, and thus the conductive adhesive can be applied to a wider range of applications. Here, to be "liquid" means to exhibit fluidity and specifically means the shape cannot be retained for 10 minutes or more and a change in shape is caused when the component is inclined by 45°.

<Component (A)>

The component (A) used in the present invention is an alicyclic epoxy resin (epoxy resin having an alicyclic epoxy group). By containing the component (A), it is possible to suppress erosion of polycarbonate. (See Example 1 and Comparative Examples 1 to 4 to be described later).

The component (A) is preferably an alicyclic epoxy resin having two or more alicyclic epoxy groups in one molecule. By having two or more alicyclic epoxy groups in one molecule, the curability is accelerated and a denser cross-linked structure can be formed. Hence, the cured product to be obtained exhibits more favorable physical properties (conductivity, adhesive property and the like). On the other hand, from the viewpoint of a balance between curability and storage stability of the adhesive, the number of alicyclic epoxy groups contained in one molecule of the component (A) is preferably 3 or less and more preferably 2 or less. That is, in an embodiment of the present invention, the component (A) is an alicyclic epoxy resin having two alicyclic epoxy groups in one molecule.

The alicyclic epoxy group is an epoxy group which is directly bonded to a carbon atom forming an alicyclic ring, and examples thereof include 3,4-epoxycyclohexyl group, 2,3-epoxy cyclopentyl group and the like. Among these, a 3,4-epoxycyclohexyl group is preferable from the viewpoint of further improving the effects of the present invention.

Specific examples of the component (A) include 3,4-epoxycyclohexylmethyl-3,4-epoxycyclohexanecarboxylate, bis(3,4-epoxycyclohexylmethyl) adipate, 2-(3,4-epoxycyclohexyl-5,5-spiro-3,4-epoxy)cyclohexanone-m-dioxane, bis(2,3-epoxycyclopentyl) ether and the like. Among these, 3,4-epoxycyclohexylmethyl-3,4-epoxycyclohexanecarboxylate is preferable from the viewpoint of further improving the effects of the present invention.

A commercially available product may be used as the component (A). Specific examples thereof include CEL-LOXIDE (registered trademark) 2021P manufactured by DAICEL CORPORATION, TTA21P manufactured by JIANGSU TETRA NEW MATERIAL TECHNOLOGY CO., LTD., UVR 6105, UVR 6110, and UVR 6128 manufactured by Nantong Synasia New Material Co., Ltd., ERL4221E and ERL4299 manufactured by Polysciences, Inc., and the like.

As the component (A), one kind may be used singly or two or more kinds may be used concurrently. By using two or more kinds concurrently, it is possible to easily adjust the viscosity to improve workability and the properties of the cured product.

The component (A) is preferably liquid at 25° C. Furthermore, for reasons such as wetting and dispersibility of the conductive filler, the viscosity of the component (A) at 25° C. is preferably 10 to 10,000 mPa·s and more preferably 50 to 1,000 mPa·s. Incidentally, the viscosity of the component (A) is a value measured using a cone plate type rotational viscometer.

From the viewpoint of further improving the effects of the present invention, the epoxy equivalent of the component (A) is preferably 50 to 250 g/eq and more preferably 100 to 150 g/eq. Here, the epoxy equivalent is a value measured in conformity with JIS K7236: 2001.

<Component (B)>

The component (B) of the present invention is a boron-based thermal cationic initiator. The component (B) generates cation species when being heated. By combining the component (B) with the component (A) described above, it is possible to forma cured product exhibiting excellent conductivity at a low temperature. (See Example 1 and Comparative Example 5 to be described later). As the component (B), one kind may be used singly or two or more kinds may be used concurrently.

From the viewpoint of further improving the curability of the adhesive and the conductivity of the cured product, the component (B) preferably contains a salt of a quaternary ammonium cation and a borate anion. As the borate anion, tetrafluoroborate anion and tetrakis(pentafluorophenyl)borate anion are preferable and tetrakis(pentafluorophenyl) borate anion is more preferable from the viewpoint of further improving the curability of the adhesive and the conductivity of the cured product. That is, in an embodiment of the present invention, the component (B) contains preferably at least either of a salt of a quaternary ammonium cation and a tetrafluoroborate anion or a salt of a quaternary ammonium cation and a tetrakis(pentafluorophenyl)borate anion and more preferably a salt of a quaternary ammonium cation and a tetrakis(pentafluorophenyl)borate anion.

As the component (B), a commercially available product may be used, and examples thereof include K-PURE (registered trademark) CXC-1821 manufactured by King Industries, Inc., and the like.

From the viewpoint of further improving adhesive property and/or conductivity, the content of the component (B) in the conductive adhesive of the present invention is preferably 0.05 part by mass or more, more preferably 0.1 part by mass or more, still more preferably 0.5 part by mass or more, and particularly preferably 1 part by mass or more with respect to 100 parts by mass of the component (A). On the other hand, from the viewpoint of storage stability of the adhesive, the content of the component (B) in the conductive adhesive of the present invention is preferably 40 parts by mass or less, more preferably 30 parts by mass or less, still more preferably 20 parts by mass or less, and particularly preferably 10 parts by mass or less with respect to 100 parts by mass of the component (A). That is, the conductive adhesive according to an embodiment of the present invention contains the component (B) preferably at 0.1 to 30 parts by mass and more preferably at 1 to 20 parts by mass with respect to 100 parts by mass of the component (A).

<Component (C)>

The component (C) used in the present invention is a conductive filler. As the component (C), one kind may be used singly or two or more kinds may be used concurrently.

The conductive filler is not particularly limited, and metal powders such as gold, silver, copper, nickel, and palladium; alloy powders such as solder obtained by combining a plurality of the metals; organic polymer particles; plated particles obtained by coating metal particles with another metal thin film; and the like. Among these, metal powders are preferable, and gold powder, silver powder and/or copper powder are more preferable. Gold exhibits stable conductivity, but is expensive, and thus tends to be used in applications requiring high stability. Hence, the component (C) is more preferably silver powder and/or copper powder. Furthermore, silver and copper both have similar specific resistance and exhibit excellent conductivity, but silver is less likely to be oxidized than copper, and it is easier to handle silver than copper, and thus silver is most preferable. That is, the component (C) is particularly preferably silver powder.

The shape of the component (C) is not particularly limited, and examples thereof include a spherical shape, an unstructured shape, a scale shape, a needle shape, a dendritic shape and the like. In the present specification, a "spherical shape" means that the average circularity is 0.4 or more. The circularity is a value represented by X/Y, for example, in a case in which a particle projection image is acquired using a flow type particle image analyzer FPIA-3000 (manufactured by Malvern Panalytical Ltd.) and the perimeter of a circle having the same projected area as the particle projection image is denoted as X and the length of the contour line of the particle projection image is denoted as Y. Furthermore, the average circularity is calculated by summing the circularities of the respective particles and dividing the sum by the total number of particles (for example, 100 particles). In addition, in the present specification, shapes other than the spherical shape are collectively referred to as "non-spherical shapes" in some cases.

As the component (C), conductive filler having one shape may be used, or conductive fillers having a plurality of shapes may be used in combination, but the latter is preferable. The conductive adhesive basically exerts conductivity as the conductive fillers come close to each other and is thus designed so that the conductive fillers are most closely packed in the adhesive. Here, this is because it is possible to achieve a state closer to the closest packing and to exert superior conductivity by using conductive fillers having a plurality of shapes in combination. Furthermore, it is possible to realize properties (viscosity and the like) suitable for coating by combining conductive fillers having a plurality of shapes. Consequently, in a preferred embodiment of the present invention, the component (C) has a plurality of shapes. For the same reasons as above, it is more preferable to use a spherical conductive filler and a non-spherical (for example, scaly) conductive filler in combination as the component (C). Consequently, in a more preferred embodiment of the present invention, the component (C) contains a spherical conductive filler and a non-spherical conductive filler.

The mass ratio of the spherical conductive filler to the non-spherical conductive filler (spherical:non-spherical) is preferably 5:95 to 50:50 and more preferably 10:90 to 40:60. The effect attained by concurrently using the spherical conductive filler and the non-spherical conductive filler is more favorably exerted when the mass ratio is in the above range.

The conductive filler as the component (C) may have a surface treated with a lubricant. As the lubricant, saturated fatty acids and/or unsaturated fatty acids can be used. Specific examples thereof include capric acid, undecylic acid, lauric acid, tridecylic acid, myristic acid, pentadecylic acid, palmitic acid, margaric acid, stearic acid, linolenic acid, linoleic acid, palmitoleic acid, oleic acid and the like. Among these, oleic acid or stearic acid is preferable from the viewpoint of dispersibility of the conductive filler in the adhesive and conductivity of the cured product. The lubricant is used in the manufacture for the purpose of preventing aggregation, improving dispersibility, and the like, when processing a solid or powdery metal. Even in the conductive adhesive, the lubricant improves the wettability and dispersibility of the conductive filler and the resin and further suppresses the oxidation of the surface of the conductive filler, and thus higher conductivity can be realized. That is, in an embodiment of the present invention, the component (C) is a conductive filler having a surface treated with a lubricant.

A tap density of each conductive filler as the component (C) is preferably 0.1 to 100 g/cm$^3$. This is because the conductive filler can be highly densely and uniformly packed in the conductive adhesive and excellent conductivity can be exerted when the tap density is 0.1 to 100 g/cm$^3$. Furthermore, from the viewpoint of further improving the effects of the present invention, the tap density of each conductive filler as the component (C) is more preferably 0.5 to 30 g/cm$^3$, still more preferably 1.0 to 20.0 g/cm$^3$, yet more preferably 2.0 to 10.0 g/cm$^3$, and particularly preferably 2.5 to 5.0 g/cm$^3$. Here, the tap density of each conductive filler as the component (C) can be measured in conformity with JIS Z2512: 2012.

The 50% average particle diameter of each conductive filler as the component (C) is preferably 0.1 to 100 µm. The contact point between the adherend and the conductive filter increases in size and stable conductivity can be secured when the 50% average particle diameter is 0.1 µm or more. In addition, the conductive filler is less likely to be a cause of the nozzle or mesh clogging even at the time of adhesive application such as dispensing or screen printing when the 50% average particle diameter is 100 µm or less. Furthermore, from the viewpoint of further improving the effects of the present invention, the 50% average particle diameter of each conductive filler as the component (C) is more preferably 0.5 to 50 µm, still more preferably 1.0 to 20 µm, yet more preferably 1.5 to 10 µm, and particularly preferably 2.0 to 7.0 µm. Examples of the method for confirming the average particle diameter include image analysis using a laser diffraction scattering type or microsorting control type particle size and shape distribution measuring instrument, an optical microscope, an electron microscope and the like. In the present specification, the 50% average radius is the particle diameter at a cumulative volume ratio of 50% in the particle size distribution measured by a laser diffraction scattering method.

A BET specific surface area of each conductive filler as the component (C) is preferably 0.01 to 100 m$^2$/g. This is because the conductive filler is likely to be dispersed in the adhesive when the BET specific surface area is 0.01 to 100 m$^2$/g and thus more stable conductivity can be secured. Furthermore, from the viewpoint of further improving the effects of the present invention, the BET specific surface area of each conductive filler as the component (C) is more preferably 0.05 to 20 m$^2$/g, yet more preferably 0.1 to 5.0 m$^2$/g, and particularly preferably 0.2 to 3.0 m$^2$/g. In the present specification, a value calculated by a BET method is adopted as the BET specific surface area.

In a case in which conductive fillers having different particle diameters are used as the component (C), it is preferable to use a conductive filler (C-1) having a 50% average particle diameter of 3 µm or more and a conductive filler (C-2) having a 50% average particle diameter of less than 3 µm in combination. By using the component (C-1) and the component (C-2) in combination, the conductive filler can be most closely packed in the conductive adhesive and higher conductivity can be realized. In addition, the adhesive property to plastics (particularly carbonate) can be further improved. Furthermore, from the viewpoint of further improving the conductivity of the cured product, a ratio of a mass of the component (C-1) to a mass of the component (C-2) (mass of the component (C-1)/mass of the component (C-2)) is preferably 0.01 to 30, more preferably 0.1 to 20, still more preferably 0.2 to 10, and particularly preferably 1 to 5. The 50% average particle diameter of the component (C-1) is preferably 10 μm or less and more preferably 7 μm or less. In addition, the 50% average particle diameter of the component (C-2) is preferably 0.1 μm or more and more preferably 1 μm or more.

In the conductive adhesive of the present invention, the component (C) (the total amount thereof in the case of concurrently using two or more kinds) is contained preferably at 1 to 1500 parts by mass, more preferably 2 to 1000 parts by mass, still more preferably 3 to 500 parts by mass, and particularly preferably 4 to 300 parts by mass with respect to 100 parts by mass of the sum of the component (A) and the component (B). This is because favorable conductivity can be exerted while securing properties such as viscosity and adhesive force as an adhesive when the content is in the above range.

<Optional Components>

In the adhesive composition of the present invention, appropriate amounts of additives such as epoxy resins (bisphenol A-type epoxy resin, bisphenol F-type epoxy resin, oxetane resin, hydrogenated epoxy resin, amino group-modified epoxy resin, acrylic group-modified epoxy resin, rubber-modified epoxy resin, and the like) other than the alicyclic epoxy resin, a photocationic initiator, colorants such as a pigment and a dye, a plasticizer, an antioxidant, a defoamer, a solvent, an adhesive property imparting agent, a leveling agent, a rheology controlling agent, an organic filler other than the conductive filler, an inorganic filler other than the conductive filler, and the like may be blended as long as the properties of the present invention are not impaired. By the addition of these, it is possible to obtain a composition and a cured product thereof exhibiting various excellent properties (curability, resin strength, adhesive strength, workability, storability and the like).

<Application>

The conductive adhesive of the present invention can be formed into a cured product by being heated at a low temperature. The heating condition for forming a cured product is not particularly limited, but heating is performed, for example, at 40° C. to 100° C. (preferably 50° C. to 80° C.) for about 10 to 120 minutes. The cured product exhibits excellent conductivity and adhesive property to plastics (particularly polycarbonate) and the like. Hence, the conductive adhesive can be used in camera modules and sensors, connection of electrodes of liquid crystal displays and the like, grounding, electromagnetic wave shielding, heat dissipation application, and the like. Consequently, an embodiment of the present invention is a conductive adhesive to be used for an adherend containing polycarbonate. In addition, an embodiment of the present invention is a cured product of the conductive adhesive.

EXAMPLES

Next, the present invention will be described in more detail with reference to Examples, but the present invention is not limited only to these Examples.

Examples 1 to 5 and Comparative Examples 1 to 5

The following components were prepared to prepare adhesives of Examples 1-5 and Comparative Examples 1-5.

<Component (A)> Alicyclic Epoxy Resin 3,4-Epoxycyclohexylmethyl-3,4-epoxycyclohexancarboxylate (CELLOXIDE (registered trademark) 2021P manufactured by DAICEL CORPORATION, viscosity (25° C.) 100 to 600 mPa·s, epoxy equivalent 128 to 145 g/eq)

<Epoxy Resin Other than Component (A)>

Bisphenol A-type epoxy resin (EPICLON (registered trademark) EXA-850CRP manufactured by DIC Corporation)

Bisphenol F-type epoxy resin (EPICLON (registered trademark) EXA-830LVP manufactured by DIC Corporation)

<Component (B)> Boron-Based Thermal Cationic Initiator

Salt of tetrakis(pentafluorophenyl)borate anion and a quaternary ammonium cation (K-PURE (registered trademark) CXC-1821 manufactured by King Industries, Inc.)

<Curing Agent Other than Component (B)>

Aliphatic polyamine-based curing agent (Fujicure (registered trademark) FXE-1000 manufactured by T & K TOKA CO., LTD.)

Hexafluoroantimonic acid and sulfonium salt (SAN-AID (registered trademark) SI-80L manufactured by SANSHIN CHEMICAL INDUSTRY CO., LTD.)

<Component (C)>

Silver powder (C-1): Scaly silver powder having surface treated with oleic acid and following powder properties:

Tap density: 5.0 g/cm$^3$

50% average particle diameter: 6.7 μm

BET specific surface area: 0.3 m$^2$/g

Silver powder (C-2): Spherical silver powder having surface treated with stearic acid and following powder properties:

Tap density: 2.5 g/cm$^3$

50% average particle diameter: 2.3 μm

BET specific surface area: 2.6 m$^2$/g

The method for producing the conductive adhesives according to Examples 1 to 5 and Comparative Examples 1 to 5 is as follows. The component (A) (or the component (A)') and the component (C) were weighed and stirred for 30 minutes using a planetary mixer to disperse the component (C). Next, the component (B) (or component (B)') was weighed and added to the dispersion, and then the mixture was stirred for 30 minutes using a planetary mixer while performing degassing in a vacuum to obtain a conductive adhesive. The conductive adhesives obtained were all liquid at 25° C. The detailed preparation amounts areas presented in Table 1, and the numerical values are all expressed in parts by mass.

The conductive adhesives of Examples 1 to 5 and Comparative Examples 1 to 5 were subjected to the following tests.

<Test on Erodibility of Polycarbonate>

On a polycarbonate test piece having a length of 100 mm, a width of 25 mm, and a thickness of 2.0 mm, 1 g of each conductive adhesive presented in Table 1 was dropped and allowed to stand at 25° C. for 60 minutes. Thereafter, the adhesive was wiped off with a waste cloth, the surface of the test piece was observed, and the presence or absence of erodibility of polycarbonate was visually confirmed:

[Evaluation Criteria]

○: Erosion or discoloration of test piece is not observed.

x: Erosion or discoloration of test piece is observed.

<Test on Volume Resistivity>

Masking was performed on a glass plate having a length of 100 mm, a width of 100 mm, and a thickness of 2.0 mm in a shape having a length of 100 mm, a width of 10 mm, and a thickness of 50 μm, each of the conductive adhesives presented in Table 1 was squeegeed to form a coating film. At this time, the surface of the coating film is flat and the width of the masking is parallel to the test plate. In addition, attention is paid so that bubbles are not mixed into the conductive adhesive at the time of squeegeeing. Next, the masking was peeled off, and the conductive adhesive (coating film) was cured by being heated at 80° C. for 60 minutes using a hot air drying oven to fabricate a test piece. After the The "adhesive strength (MPa)" of the cured product was calculated from the adhesive area of the ceramic chip. The adhesive force was judged as pass when it was ◯ or higher in the following evaluation criteria:

[Evaluation Criteria]

⊙: Adhesive force is 5 MPa or more.

◯: Adhesive force is 1 MPa or more and less than 5 MPa.

x: Adhesive force is less than 1 MPa.

TABLE 1

| Component | Name of raw material | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| (A) | CELLOXIDE 2021P | 100 | 100 | 100 | 100 | 100 | | | | | 100 |
| (A') | EPICLON EXA-850CRP | | | | | | 100 | | | 100 | |
| | EPICLON EXA-830LVP | | | | | | | 100 | | | |
| | ARON OXETANE OXT-221 | | | | | | | | 100 | | |
| (B) | K-PURE CXC-1821 | 10 | 0.1 | 10 | 10 | 10 | 10 | 10 | 10 | | |
| (B') | Fujicure FXE-1000 | | | | | | | | | 20 | |
| | SAN-AID SI-80L | | | | | | | | | | 10 |
| (C) | Silver powder (C-1) | 200 | 200 | 5 | 250 | | 200 | 200 | 200 | 200 | 200 |
| | Silver powder (C-2) | 50 | 50 | | | 250 | 50 | 50 | 50 | 50 | 50 |
| Test on erodibility of polycarbonate | 25° C. × 60 min | ◯ | ◯ | ◯ | ◯ | ◯ | X | X | X | X | ◯ |
| Volume resistivity | 80° C. × 60 min | ⊙ | ◯ | ◯ | ◯ | ◯ | X | X | X | ◯ | X |
| Adhesive force | | ⊙ | ◯ | ⊙ | ⊙ | ◯ | X | X | X | ◯ | ◯ | temperature of the test piece was dropped to room temperature, the "resistance (Ω)" when the "distance between electrodes (m)" was 50 mm was measured using a tester equipped with an electrode having a width of 15 mm (MICROHMMETER manufactured by ADVANTEST CORPORATION). The volume resistivity was judged as pass when it was ◯ or higher in the following evaluation criteria:

[Evaluation Criteria]

⊙: Volume resistivity is less than $10^{-5}$ Ω·m.

◯: Volume resistivity is $10^{-5}$ Ω·m or more and less than $10^{-4}$ Ω·m.

x: Volume resistivity is $10^{-4}$ Ω·m or more.

<Test on Adhesive Property to Polycarbonate>

Masking was performed on a polycarbonate test piece having a length of 100 mm, a width of 25 mm, and a thickness of 2.0 mm in a shape having a length of 100 mm, a width of 10 mm, and a thickness of 50 μm, each of the conductive adhesives presented in Table 1 was squeegeed. At this time, the surface of the coating film is flat and the width of the masking is parallel to the test plate. In addition, attention is paid so that bubbles are not mixed into the conductive adhesive at the time of squeegeeing. After the masking was peeled off, a ceramic chip having 2 mm φ and a height of 1 mm was placed on the coating film, and the conductive adhesive (coating film) was cured by being heated at 80° C. for 60 minutes using a hot air drying oven to fabricate a test piece. After the temperature of the test piece was dropped to room temperature, a digital force gauge with contactor (manufactured by Nidec-Shimpo Corporation) was moved at a constant speed in the horizontal direction to the polycarbonate plate, and the maximum strength at which the ceramic chip peeled off was measured.

As presented in Table 1, when Example 1 is compared with Comparative Examples 1 to 4, there is a difference in the component (A). Comparative Examples 1 to 4 in which the component (A)' was used instead of the component (A) eroded polycarbonate, but Example 1 in which the component (A) was used did not erode polycarbonate. Furthermore, in Comparative Examples 1 to 3, the curability was significantly deteriorated and the desired volume resistivity and adhesive force were not exerted.

The component (B) is different between Example 1 and Comparative Examples 4 and 5. Comparative Example 4 exhibited favorable conductivity and adhesive property but eroded polycarbonate. Comparative Example 5 did not erode polycarbonate but the volume resistivity was not exerted.

As presented in Table 1, in Example 2 with small amount of the component (B) added, the conductivity and the adhesive force were slightly low as a result. In Example 3 with small amount of the component (C) added, the volume resistivity was high but the adhesive force was high probably due to a decrease in the conductive filler. In addition, when Example 1 was compared with Examples 3 to 5, the volume resistivity in Examples 3 to 5 in which silver powder (C-1) or silver powder (C-2) was used singly was higher than that in Example 1 in which silver powder (C-1) and silver powder (C-2) were used in combination.

It was confirmed that the conductive adhesives of Examples exhibited excellent low-temperature curability since they exert favorable conductivity and adhesive force when being cured at 80° C. for 60 minutes. In addition, it can be seen that the cured products formed from the conductive adhesives of Examples have a low volume resistivity and exert high adhesive force and thus sufficiently have the performance as a conductive adhesive.

INDUSTRIAL APPLICABILITY

The conductive adhesive according to the present invention can form a cured product by being heated at a low temperature. The cured product exhibits excellent conductivity and adhesive property to plastics (particularly polycarbonate) and the like. For this reason, the conductive adhesive can be utilized in applications for connecting various members which have not been able to be used conventionally. Consequently, the conductive adhesive is useful for a wide range of applications including the electric and electronic parts field, the automobile parts field, the aircraft parts field, and the like.

This application is based on Japanese Patent Application No. 2018-023713 filed on Feb. 14, 2018, the entire contents of which are incorporated herein by reference.

The invention claimed is:

1. A conductive adhesive comprising the following components (A) to (C), the conductive adhesive being liquid at 25° C.:
   component (A): an alicyclic epoxy resin;
   component (B): a boron-based thermal cationic initiator; and
   component (C): a conductive filler,
   wherein the component (C) contains a conductive filler (C-1) having a 50% average particle diameter of 3 μm or more and a conductive filler (C-2) having a 50% average particle diameter of less than 3 μm, and a ratio of a mass of the component (C-1) to a mass of the component (C-2) is 0.01 to 30.

2. The conductive adhesive according to claim 1, wherein the component (B) contains a salt of a quaternary ammonium cation and a borate anion.

3. The conductive adhesive according to claim 1, wherein the component (B) contains at least either of a salt of a quaternary ammonium cation and a tetrafluoroborate anion or a salt of a quaternary ammonium cation and a tetrakis (pentafluorophenyl)borate anion.

4. The conductive adhesive according to claim 1, wherein at least one of the component (C-1) or the component (C-2) has a surface treated with a lubricant.

5. The conductive adhesive according to claim 1, wherein the component (A) is an alicyclic epoxy resin having two or more epoxy groups in one molecule.

6. The conductive adhesive according to claim 1, wherein a tap density of each conductive filler as the component (C) is 0.1 to 100 g/cm$^3$.

7. The conductive adhesive according to claim 1, wherein the component (C) has a plurality of shapes.

8. The conductive adhesive according to claim 1, wherein the component (B) is contained at 0.1 to 30 parts by mass with respect to 100 parts by mass of the component (A).

9. The conductive adhesive according to claim 1, wherein the component (B) is contained at 1 to 20 parts by mass with respect to 100 parts by mass of the component (A).

10. The conductive adhesive according to claim 1, which is used for an adherend containing polycarbonate.

11. A cured product of the conductive adhesive set forth in claim 1.

* * * * *